(12) United States Patent
Nakamura et al.

(10) Patent No.: US 10,694,116 B2
(45) Date of Patent: Jun. 23, 2020

(54) IMAGE TRANSMISSION APPARATUS AND CONTROL METHOD THEREOF

(71) Applicant: CANON KABUSHIKI KAISHA, Tokyo (JP)

(72) Inventors: Koki Nakamura, Tokyo (JP); Tatsuya Nakamura, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/121,382

(22) Filed: Sep. 4, 2018

(65) Prior Publication Data

US 2019/0075251 A1   Mar. 7, 2019

(30) Foreign Application Priority Data

Sep. 7, 2017 (JP) ................................ 2017-171862

(51) Int. Cl.
  *H04N 5/262* (2006.01)
  *G06T 3/40* (2006.01)
  *H04N 9/04* (2006.01)

(52) U.S. Cl.
  CPC ......... *H04N 5/2628* (2013.01); *G06T 3/4015* (2013.01); *H04N 9/04559* (2018.08)

(58) Field of Classification Search
  CPC . H04N 5/2628; H04N 9/04559; G06T 3/4015
  See application file for complete search history.

(56) References Cited

U.S. PATENT DOCUMENTS

| | | | |
|---|---|---|---|
| 2005/0117022 A1* | 6/2005 | Marchant | H04N 1/00281 348/207.11 |
| 2013/0223341 A1* | 8/2013 | Kim | H04W 8/005 370/328 |
| 2014/0140415 A1* | 5/2014 | Choe | H04N 21/23439 375/240.25 |

FOREIGN PATENT DOCUMENTS

| | | |
|---|---|---|
| JP | 2013-211644 A | 10/2013 |
| JP | 2015-019182 A | 1/2015 |

* cited by examiner

*Primary Examiner* — Yogesh K Aggarwal
(74) *Attorney, Agent, or Firm* — Canon U.S.A., Inc. IP Division

(57) ABSTRACT

When image data having a size larger than a size transmittable in a predetermined format is to be transmitted, an image transmission apparatus divides the image data in a raster scanning direction in a unit of a predetermined number of pixels and sequentially allocates the image data of the unit of a predetermined number of pixels to a plurality of divided images in an order of the raster scanning direction to divide the image data into the plurality of divided images, and outputs the plurality of divided images through a plurality of transmission paths.

17 Claims, 19 Drawing Sheets

FIG.2

|   | 1 | 2 | 3 | 4 | 5 | 6 | 7 | 8 | 9 |
|---|---|---|---|---|---|---|---|---|---|
| 1 | R | Gr | R | Gr | R | Gr | R | Gr | R |
| 2 | Gb | B | Gb | B | Gb | B | Gb | B | Gb |
| 3 | R | Gr | R | Gr | R | Gr | R | Gr | R |
| 4 | Gb | B | Gb | B | Gb | B | Gb | B | Gb |
| 5 | R | Gr | R | Gr | R | Gr | R | Gr | R |
| 6 | Gb | B | Gb | B | Gb | B | Gb | B | Gb |
| 7 | R | Gr | R | Gr | R | Gr | R | Gr | R |

R ··· Red
Gr ··· Green
Gb ··· Green
B ··· Blue

FIG. 4A Red

FIG. 4B Green (Gr)

FIG. 4C Green (Gb)

FIG. 4D Blue

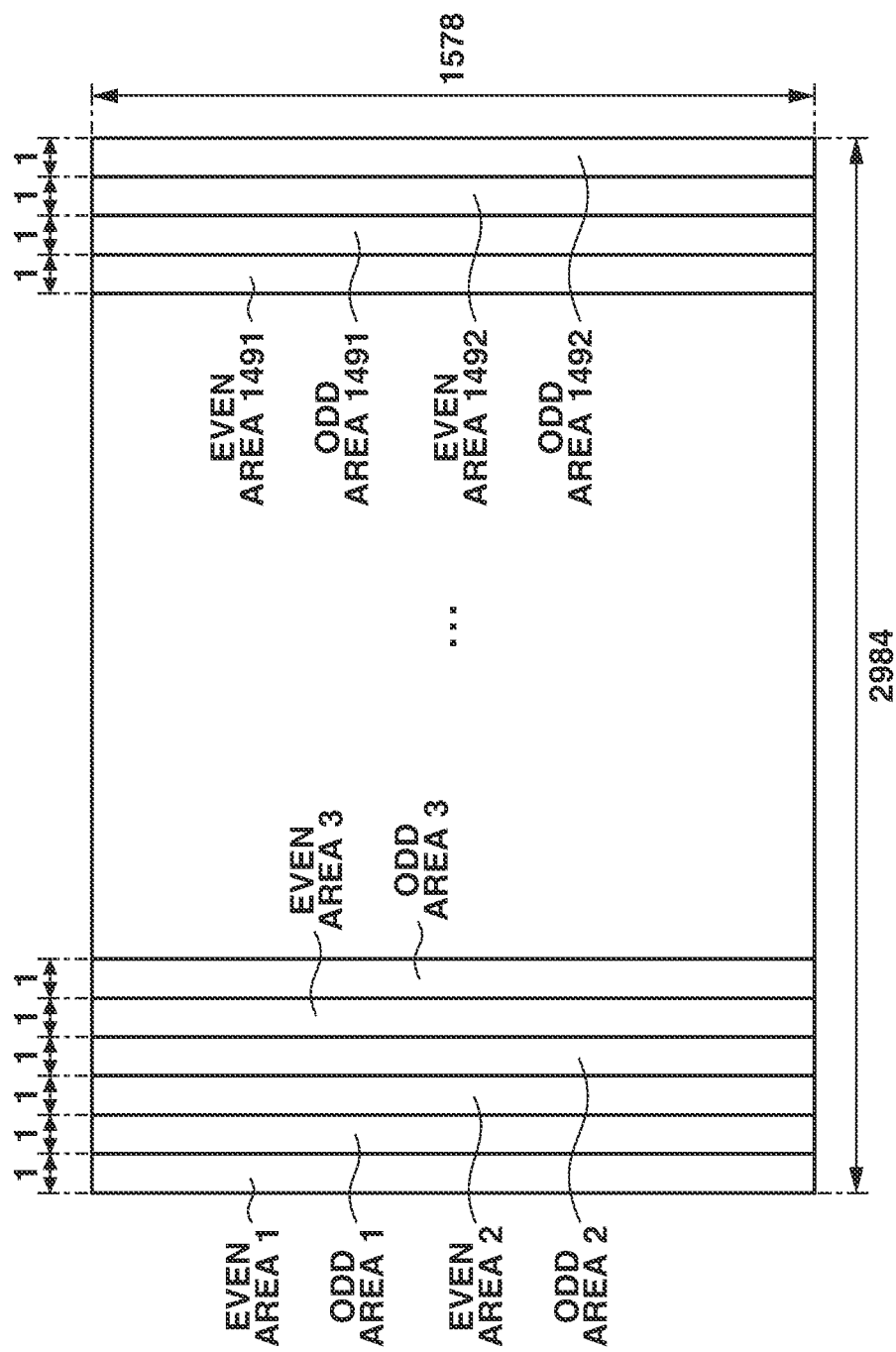

FIG.7A Red

FIG.7B Green (Gr)

FIG.7C Green (Gb)

FIG.7D Blue

FIG.9A Red

FIG.9B Green (Gr)

FIG.9C Green (Gb)

FIG.9D Blue

FIG.11

| 3G-SDI SIGNAL | | PIXEL DATA MULTIPLEXING ORDER |
|---|---|---|
| Link A | DATA STREAM 1 | Gb(0,0), Gb(0,2), Gb(0,4), Gb(0,6), ..., Gb(0,2982), Gb(1,0), Gb(1,2), ..., Gb(1577,2980), Gb(1577,2982) |
| | DATA STREAM 2 | B(0,0), R(0,0), B(0,4), R(0,4), ..., B(0,2980), R(0,2980), B(1,0), R(1,0), ..., B(1577,2980), R(1577,2980) |
| Link B | DATA STREAM 1 | Gr(0,0), Gr(0,2), Gr(0,4), Gr(0,6), ..., Gr(0,2982), Gr(1,0), Gr(1,2), ..., Gr(1577,2980), Gr(1577,2982) |
| | DATA STREAM 2 | B(0,2), R(0,2), B(0,6), R(0,6), ..., B(0,2982), R(0,2982), B(1,2), R(1,2), ..., B(1577,2982), R(1577,2982) |

FIG. 14

| 3G-SDI SIGNAL | | PIXEL DATA MULTIPLEXING ORDER |
|---|---|---|
| Link A | DATA STREAM 1 | Gb(0,1), Gb(0,3), Gb(0,5), Gb(0,7), ..., Gb(0,2981), Gb(0,2983), Gb(1,1), Gb(1,3), ..., Gb(1577,2981), Gb(1577,2983) |
| | DATA STREAM 2 | B(0,1), R(0,1), B(0,5), R(0,5), ..., B(0,2981), R(0,2981), B(1,1), R(1,1), ..., B(1577,2981), R(1577,2981) |
| Link B | DATA STREAM 1 | Gr(0,1), Gr(0,3), Gr(0,5), Gr(0,7), ..., Gr(0,2981), Gr(0,2983), Gr(1,1), Gr(1,3), ..., Gr(1577,2981), Gr(1577,2983) |
| | DATA STREAM 2 | B(0,3), R(0,3), B(0,7), R(0,7), ..., B(0,2983), R(0,2983), B(1,3), R(1,3), ..., B(1577,2983), R(1577,2983) |

FIG.16

| | 9 | 8 | 7 | 6 | 5 | 4 | 3 | 2 | 1 | 0 |
|---|---|---|---|---|---|---|---|---|---|---|
| L(m, n) | ~ep | ep | R[1] | R[0] | Gr[1] | Gr[0] | B[1] | B[0] | Gb[1] | Gb[0] | ism
IMAGE TRANSMISSION APPARATUS AND CONTROL METHOD THEREOF

BACKGROUND OF THE INVENTION

Field of the Invention

The aspect of the embodiments relates to an image transmission apparatus which generates transmission data from image data to transmit the data and a control method thereof.

Description of the Related Art

Conventionally, an imaging apparatus using an image sensor including a pixel array in a Bayer structure has been generally known. The above image sensor takes, via a color filter, image light from an object into a photoelectric conversion element that constitutes a pixel, and outputs an image signal according to intensity of the image light. Then, a processing unit provided on the latter stage executes predetermined processing on the image signal to generate display data, and displays an image on a view finder of the imaging apparatus or an external display apparatus. Generally, pixels of R (red), G (green), and B (blue) capable of outputting respective signals of R, G, and B are arranged on the image sensor in a predetermined pattern.

Japanese Patent Application Laid-Open No 2013-211644 and Japanese Patent Application Laid-Open No. 2015-019182 discuss an apparatus which outputs data by mapping RAW data in the Bayer array onto a transmission format of the 3G-serial digital interface (3G-SDI) standardized by the Society of Motion Picture and Television Engineers (SMPTE).

However, through the 3G-SDI transmission format, only data having the resolution up to 4K (4096×2160) is transmittable, and thus it may be problematic in that RAW data having the resolution of 4K or more cannot be transmitted.

SUMMARY OF THE INVENTION

According to an aspect of the embodiments, an apparatus includes a generation unit configured to generate a plurality of pieces of transmission data in a predetermined format respectively corresponding to a plurality of divided images by dividing image data into the plurality of divided images when the image data having a size larger than a size transmittable in the predetermined format is to be transmitted, and an output unit configured to output the plurality of pieces of transmission data through a plurality of transmission paths, wherein the generation unit divides the image data in a raster scanning direction in a unit of a predetermined number of pixels and sequentially allocates the image data of the unit of a predetermined number of pixels to a plurality of divided images in an order of the raster scanning direction to divide the image data into the plurality of divided images.

Further features of the disclosure will become apparent from the following description of exemplary embodiments with reference to the attached drawings.

BRIEF DESCRIPTION OF THE DRAWINGS

FIG. 2 is a diagram schematically illustrating a pixel array in a Bayer structure.
FIGS. 4A, 4B, 4C, and 4D are diagrams illustrating data arrays for storing image data in the Bayer array in a random access memory (RAM) at each of color components.
FIG. 5 is a diagram illustrating an EVEN image area and an ODD image area when image data is divided into an EVEN image and an ODD image.
FIGS. 7A, 7B, 7C, and 7D are diagrams illustrating data array structures of an EVEN image.
FIGS. 9A, 9B, 9C, and 9D are diagrams illustrating data array structure of a cutout ODD image.
FIG. 11 is a table illustrating pixel data arrayed in respective data streams generated by a multiplexer with respect to an EVEN image.
FIG. 14 is a diagram illustrating pixel data arrayed in data streams generated by a multiplexer with respect to an ODD image.
FIG. 16 is a diagram illustrating a structure in which the lower 2-bits of pixel data of respective color components are grouped into 10-bit data.

DESCRIPTION OF THE EMBODIMENTS

Hereinafter, although an exemplary embodiment of the disclosure will be described in detail with reference to the appended drawings, the disclosure is not limited to the below-described exemplary embodiment. Further, the embodiment described hereinafter is not intended to limit the content of the invention described in the appended claims, and not all of the combinations of features described in the exemplary embodiment are required as the solutions of the disclosure.

In addition, respective functional blocks described in the present exemplary embodiment do not have to be individual pieces of hardware. In other words, for example, functions of several functional blocks may be executed by a single piece of hardware. Further, a function of one functional block or functions of a plurality of functional blocks may be executed through cooperative operation of several pieces of hardware. Furthermore, functions of respective functional blocks may be executed through software by a central processing unit (CPU) through a computer program loaded on a memory.

In the present exemplary embodiment, although a recording apparatus of the disclosure applied to an imaging apparatus will be described, the disclosure is also applicable to a mobile phone, a smartphone, a tablet-type information terminal, a note-type information terminal, or a computer.

First, a configuration of the imaging apparatus 100 of the present exemplary embodiment will be described with reference to FIG. 1. The imaging apparatus 100 of the present exemplary embodiment is configured to transmit image data including pixels in a periphery of an effective area (hereinafter, called as peripheral pixels) when image data having a Bayer structure is transmitted according to a serial digital interface (SDI) standard. Accordingly, the imaging apparatus 100 also serves as a transmission apparatus of image data in addition to serving as an imaging apparatus. In the present exemplary embodiment, it is assumed that a transmission frame rate is 30 frames, the number of transmitting pixels in a horizontal direction is 5968, the number of transmitting pixels in a vertical direction is 3156, and a bit depth is 10-bits. Then, image data is assumed to be transmitted through two 3G-SDI transmission paths.

Figure 1:
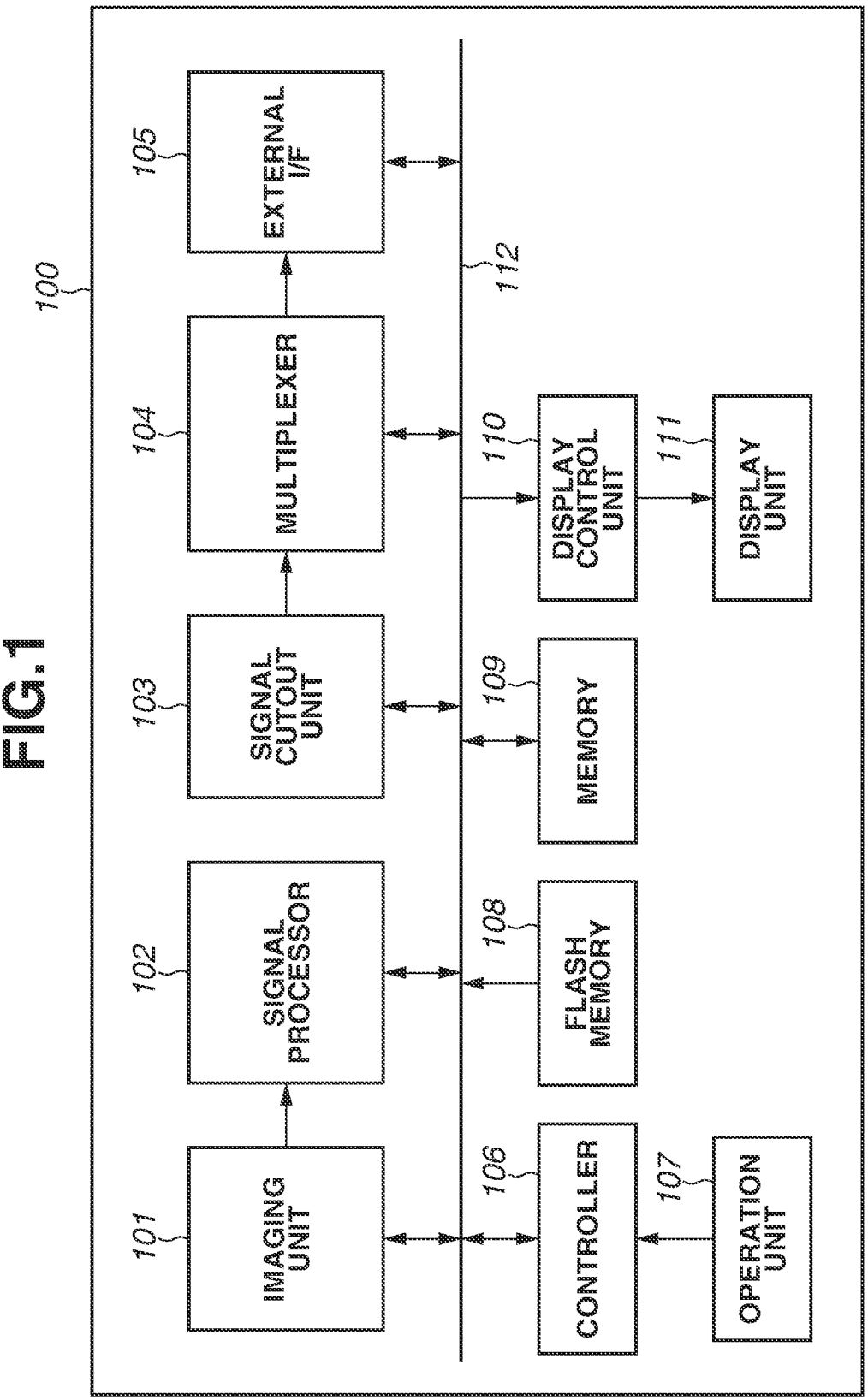
FIG. 1 is a block diagram of an imaging apparatus.

In FIG. 1, an imaging unit 101 includes an imaging lens, a shutter, an image sensor, and an analog/digital (A/D) conversion unit. The image sensor is configured of a charge coupled device (CCD) sensor or a complementary metal oxide semiconductor (CMOS) sensor having a pixel array on which a Bayer structure color filter is arranged as illustrated in FIG. 2. The image sensor converts an optical image into an electric signal and outputs image data as four pixel planes of R, Gr, Gb, and B.

A signal processor 102 executes correction processing on the image data and stores pixel planes of R, Gr, Gb, and B in a memory 109.

A signal cutout unit 103 divides the image data into a plurality of divided images having an image size transmittable in a 3G-SDI transmission format, and reads the pixel planes of R, Gr, Gb, and B from the memory 109 at each of the divided images.

From the image data read by the signal cutout unit 103, a multiplexer 104 arranges pixel data on a 3G-SDI transmission format for transmission through the 3G-SDI transmission path to generate transmission data, i.e., data stream. Then, the transmission data generated by the multiplexer 104 is transmitted to an external apparatus through an external interface (I/F) 105.

The external I/F 105 transmits, to the outside, image data according to a standard of 3G-SDI. The external I/F 105 includes two output terminals compliant with the 3G-SDI standard, i.e., 3G-SDI output terminals 1 and 2, and can transmit image data by using the two 3G-SDI transmission paths. Because two data streams can be multiplexed and transmitted through a link-A and a link-B of one 3G-SDI transmission path, a total of four data streams can be thereby multiplexed and transmitted.

A controller 106 includes one or more central processing units (CPUs), and reads control software stored in a flash memory 108 to control respective units of the imaging apparatus 100 according to the read control software. An operation unit 107 includes switches such as a power button, a recording start/end instruction button, a menu display button, a mode selection switch, and an OK button which allow a user to input various operations.

The operation unit 107 transmits an operation signal to the controller 106 when the above keys, buttons, or a touch panel is operated by the user. Various types of operators, e.g., a cursor key, a pointing device, a touch panel, and a dial may be used. Various operation members of the operation unit 107 can be realized as various functional icons displayed on the display unit 111. The user can select and operate these functional icons.

A flash memory 108 is an electrically erasable/recordable non-volatile memory, and a program for making the controller 106 operate or adjustment data unique to the imaging apparatus 100 are previously written into the flash memory 108.

The memory 109 is configured of a volatile memory such as a dynamic random access memory (DRAM), and stores image data or management data to be transmitted or various kinds of information for controlling the controller 106.

A display controller 110 executes predetermined processing such as DeBayer processing on image data having a Bayer structure acquired by the imaging unit 101 to generate display image data, and transmits the display image data to the display unit 111.

For example, the display unit 111 includes a liquid crystal display device or an organic electroluminescence (EL) display device, and displays an image, a menu screen, and information according to the control of the display control unit 110.

The above-described constituent elements are connected to an internal bus 112 serving as a path for transmitting a control signal or a data signal among respective constituent elements.

Figure 3:
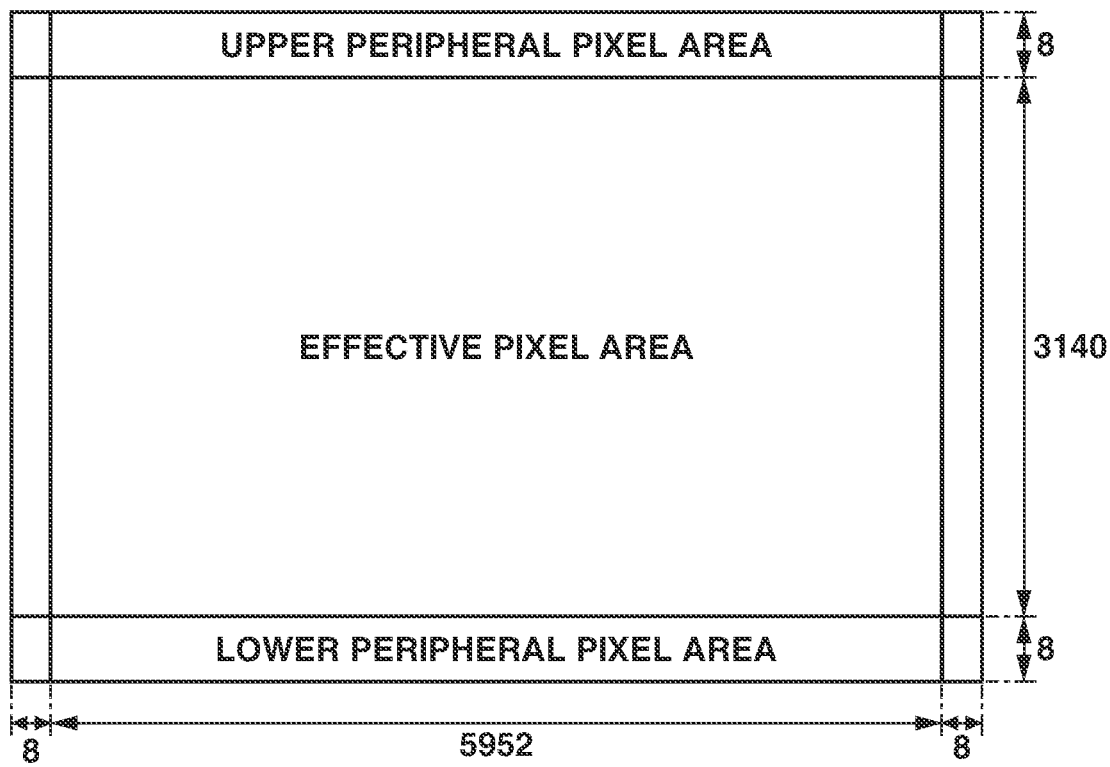
FIG. 3 is a diagram schematically illustrating a structure of pixel arrangement in a pixel area of an image sensor.
Figures 4A, 4B, 4C, 4D:
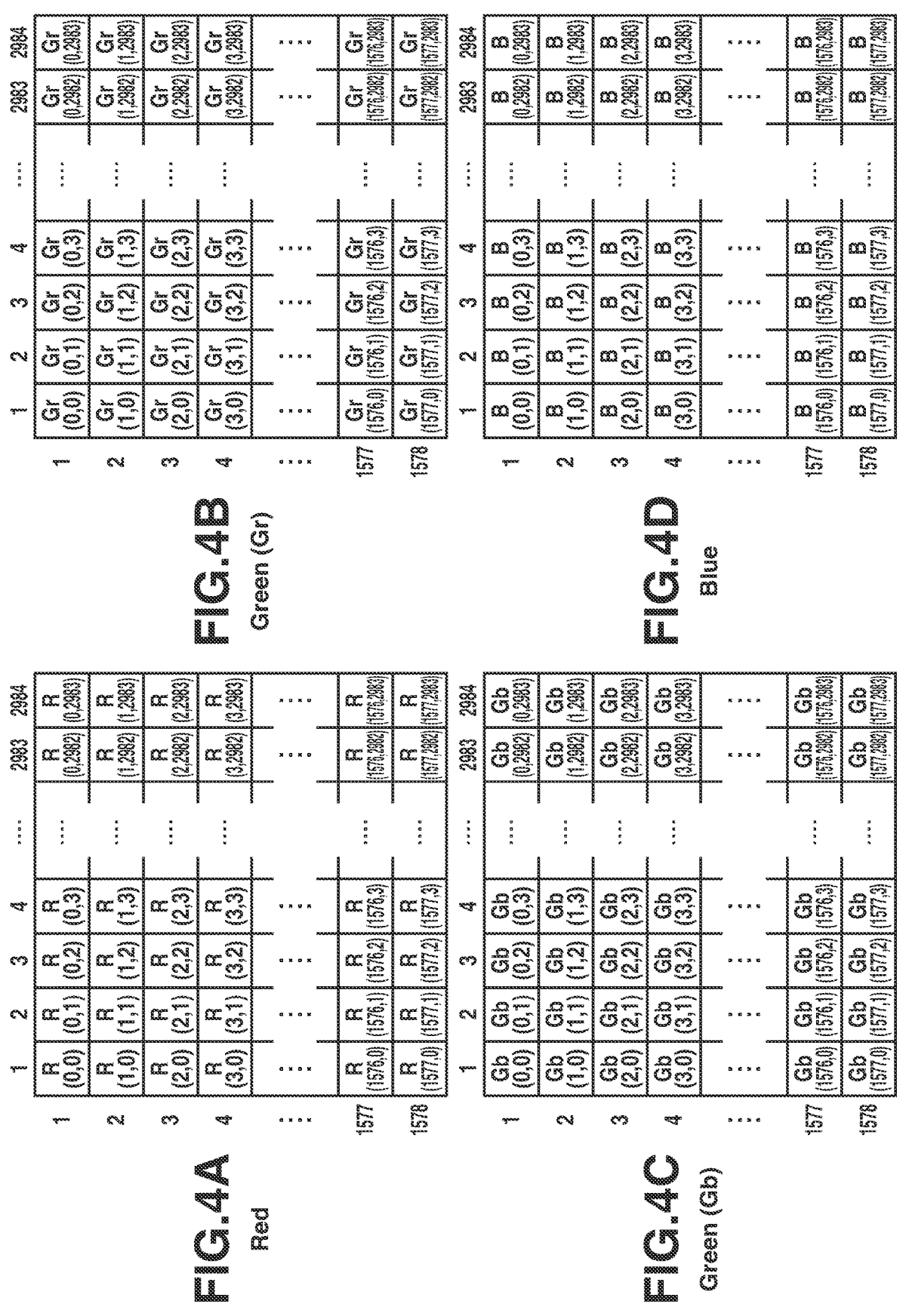

Subsequently, an image plane stored in the memory 109 will be described with reference to FIGS. 3, 4A, 4B, 4C and 4D. In the present exemplary embodiment, for example, pixel arrangement of the imaging unit 101 consists of an effective pixel area and a peripheral pixel area as illustrated in FIG. 3. A pixel data group acquirable at one time from the entire area of the pixel array is defined as a RAW frame. The RAW frame is RAW image data (hereinafter, called as "5.9K RAW") in which pixels are arrayed in the Bayer structure. In the RAW frame, 5968 pixels (5952+8+8) are arrayed in the horizontal direction, and 3156 pixels (3140+8+8) are arrayed in the vertical direction. The image data collected at respective color components of an R component, a Gr component, a Gb component, and a B component of the 5.9K RAW are illustrated in FIGS. 4A to 4D. The pixel data of each color component consists of pixels arrayed in 2984 by 1578 pixels in the horizontal direction and the vertical direction. A first pixel in the horizontal direction and the vertical direction is expressed as coordinates (0, 0), and pixels in the raster scanning direction are sequentially expressed as (0, 1), (0, 2), . . . , and so on. Because 2984 pixels are arrayed in the horizontal direction, coordinates of the pixels on the first line in the vertical direction are (0, 0) to (0, 2983). Then, coordinates of the pixels on the second line in the vertical direction are (1, 0) to (1, 2983). Because 1578 pixels are arrayed in the vertical direction, coordinates of the pixels on the last line are (1577, 0) to (1577, 2983). The signal processor 102 divides image data having the Bayer structure received through the control of the controller 106 into image data of respective colors and stores the divided image data in the memory 109. Here, a group of pixels of R, Gr, Gb, and B having the same coordinates in the pixel data of respective colors is defined as a Bayer unit. A group of four pixels, i.e., an R-pixel at the red coordinates (0, 0) in FIG. 4A, a Gr-pixel at the green (Gr) coordinates (0, 0) in FIG. 4B, a Gb-pixel at the green (Gb) coordinates (0, 0) in FIG. 4C, and a B-pixel at the blue coordinates (0, 0) in FIG. 4D, are called as the Bayer unit.

Next, processing of reading out image data from the memory 109 that is executed by the signal cutout unit 103 will be described with reference to FIG. 5. FIG. 5 is a diagram illustrating pixels of one color from among the image data divided into respective color components, and the pixels are arrayed in 2984 by 1578 pixels in the horizontal direction and the vertical direction. The image data is divided in the horizontal direction by one pixel, i.e., in one Bayer unit. The divided image data is allocated to a plurality of divided images in the order of the raster scanning direction. In the present exemplary embodiment, with respect to each of the areas of image data divided in the horizontal direction, pixels are alternately allocated to an EVEN area and an ODD area from the left end in correspondence with the coordinate values in the horizontal direction. For example, if coordinates of the horizontal direction are 0, 2, 4, . . . , and so on, the pixels are allocated to the EVEN area. If coordinates of the horizontal direction are 1, 3, 5, . . . , and so on, the pixels are allocated to the ODD area. In other words, an odd pixel on an odd-numbered line in the horizontal direction is allocated to the EVEN area (EVEN image), and an even pixel on an even-numbered line in the horizontal direction is allocated to the ODD area (ODD image). Further, serial numbers are set to the EVEN area and the ODD area in the order from the left end. Then, respective areas divided into the Bayer unit are defined as an EVEN area 1, an ODD area 1, an EVEN area 2, an ODD area 2, and so on in the order from the left end. The above definition is applied to the entire image data, so that areas at the right end are defined as an EVEN area 1491, an ODD area 1491, an EVEN area 1492, and an ODD area 1492.

Figure 6:
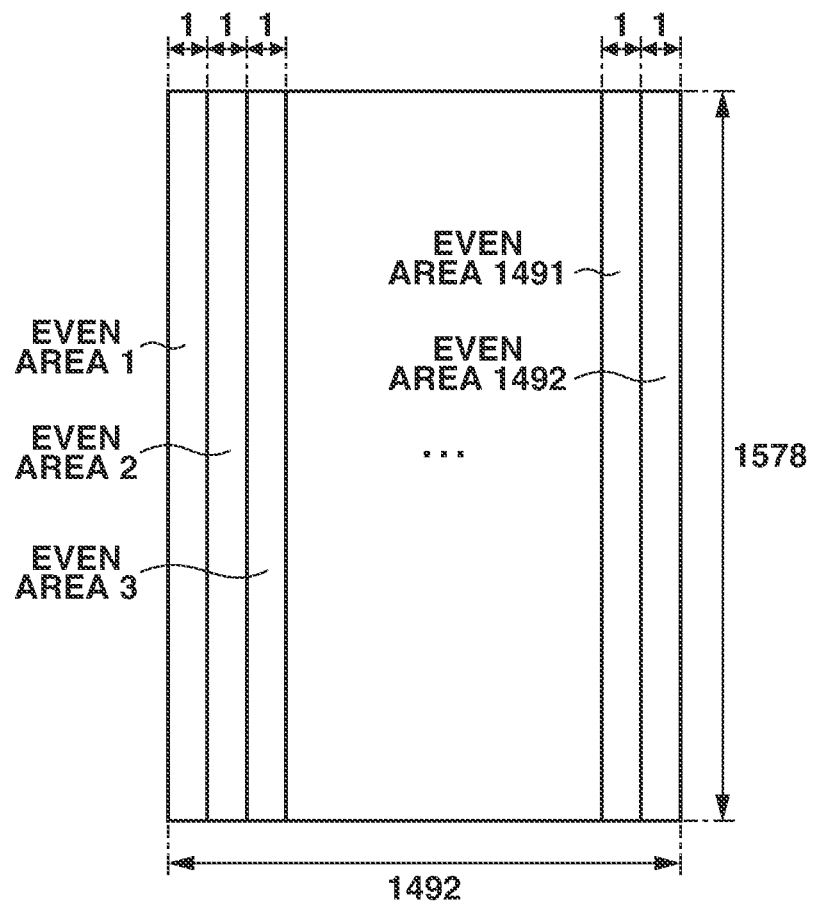
FIG. 6 is a diagram illustrating an EVEN image.
Figures 7A, 7B, 7C, 7D:
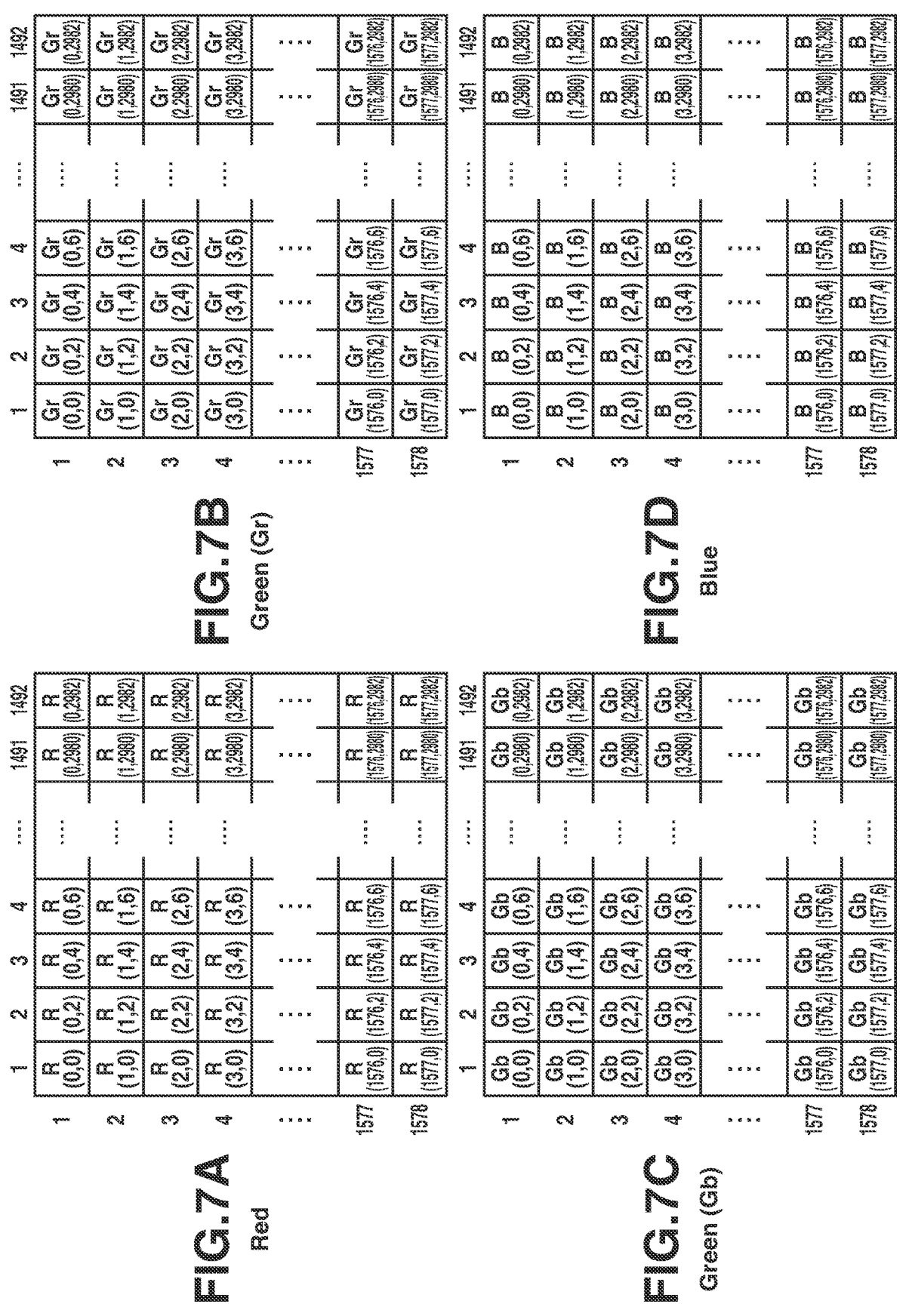

From the above areas, all of the EVEN areas, i.e., the EVEN areas 1 to 1492, are cut out as EVEN images. These cutout EVEN images are illustrated in FIG. 6. Further, pixel data of respective color components of the cutout EVEN image data are illustrated in FIGS. 7A, 7B, 7C, and 7D. In FIGS. 7A, 7B, 7C, and 7D, coordinates assigned to pixels of the respective color components correspond to the pixels in FIGS. 4A, 4B, 4C, and 4D. In other words, the same coordinates are assigned to the pixels indicating the same pixel data in FIGS. 7A to 7D and FIGS. 4A to 4D. Therefore, pixel data cut out as the EVEN images are pixels having the horizontal direction coordinates of 0, 2, 4, . . . , 2980, and 2982, and the number of pixels in the horizontal direction is 1492 that is one-half of the number of pixels in the image data illustrated in FIGS. 4A to 4D.

Figure 8:
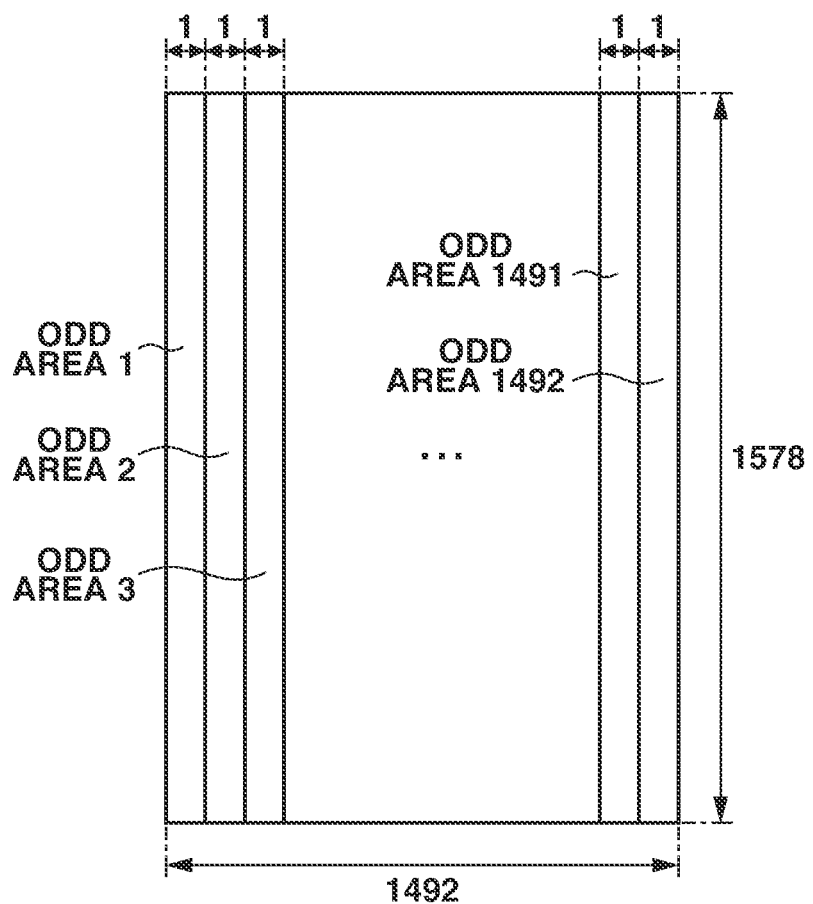
FIG. 8 is a diagram illustrating an ODD image.
Figures 9A, 9B, 9C, 9D:
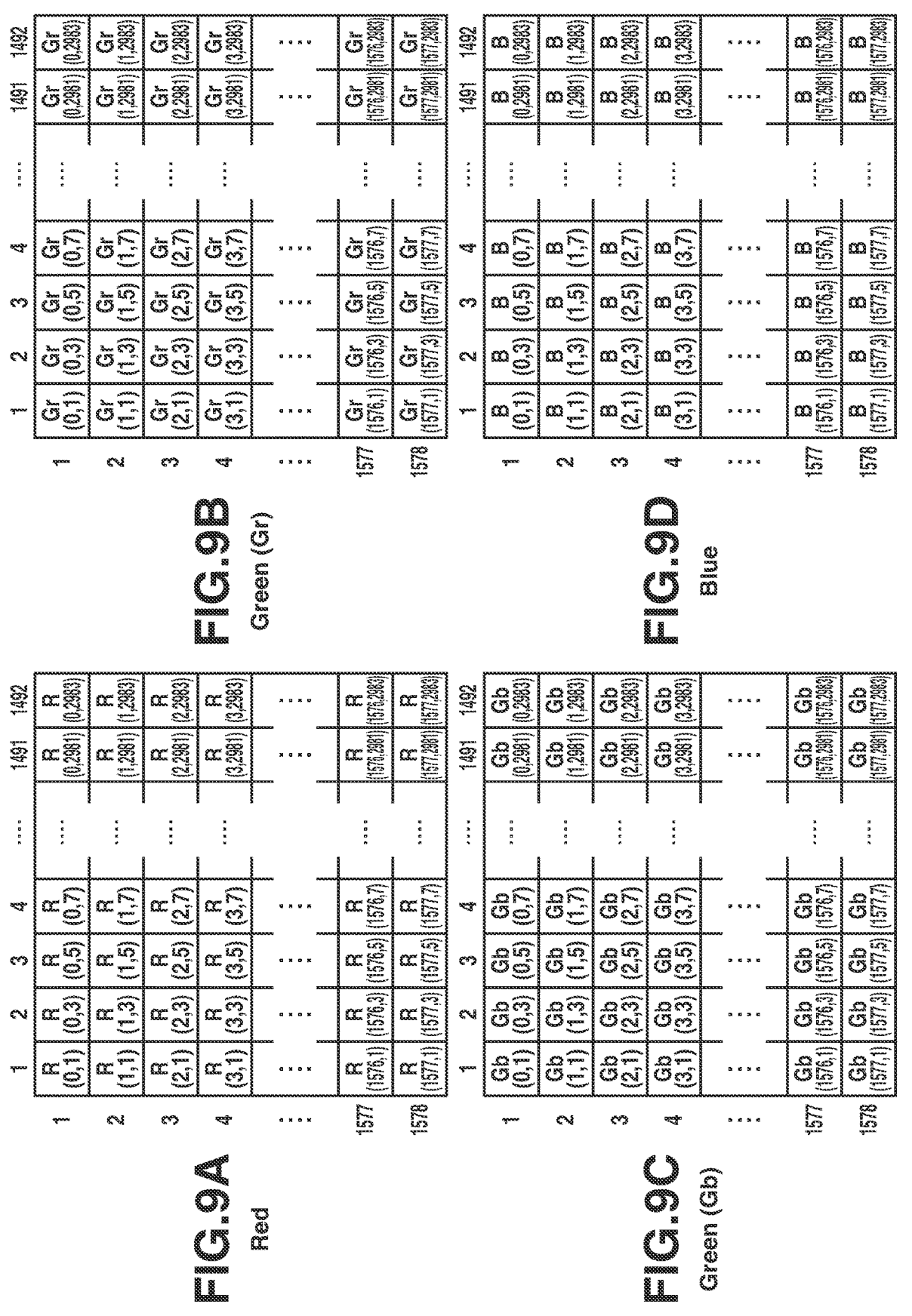

Similarly, from the above areas, all of the ODD areas, i.e., the ODD areas 1 to 1492, are cut out as ODD images. These cutout ODD images are illustrated in FIG. 8. Further, pixel data of the cutout ODD image data are illustrated in FIGS. 9A, 9B, 9C, and 9D.

As described above, the RAW frame is divided into two divided images, i.e., the EVEN image and the ODD image.

In the present exemplary embodiment, the image data is divided into two divided images (the EVEN image and the ODD image). In the above-described exemplary embodiment, although image data is divided at each image plane of the color component, RAW image data in the Bayer array may be directly divided into the EVEN image and the ODD image. Further, as described above, when the image is divided into a plurality of divided images, the image is divided such that the pixel data of respective color components having the same coordinates in the Bayer unit is allocated to the same divided image.

The mapping processing to be executed by the multiplexer 104 and image data transmission from the 3G-SDI output terminals 1 and 2 using two 3G-SDI transmission paths will be described with reference to FIGS. 10 to 15. In the present exemplary embodiment, moving image data configured of a plurality of RAW frames (plurality of pieces of RAW image data) is transmitted according to the SDI standard. Specifically, pieces of pixel data are allocated by employing a multiplex structure of R'G'B'+A/10-bits specified in SMPTE ST 372 (Dual Link), compliant with the level B of SMPTE ST 425 (3G-SDI). Further, a sample format of pixel is compliant with an image format 2048×1080 specified in SMPTE ST 2048-2.

Figure 10:
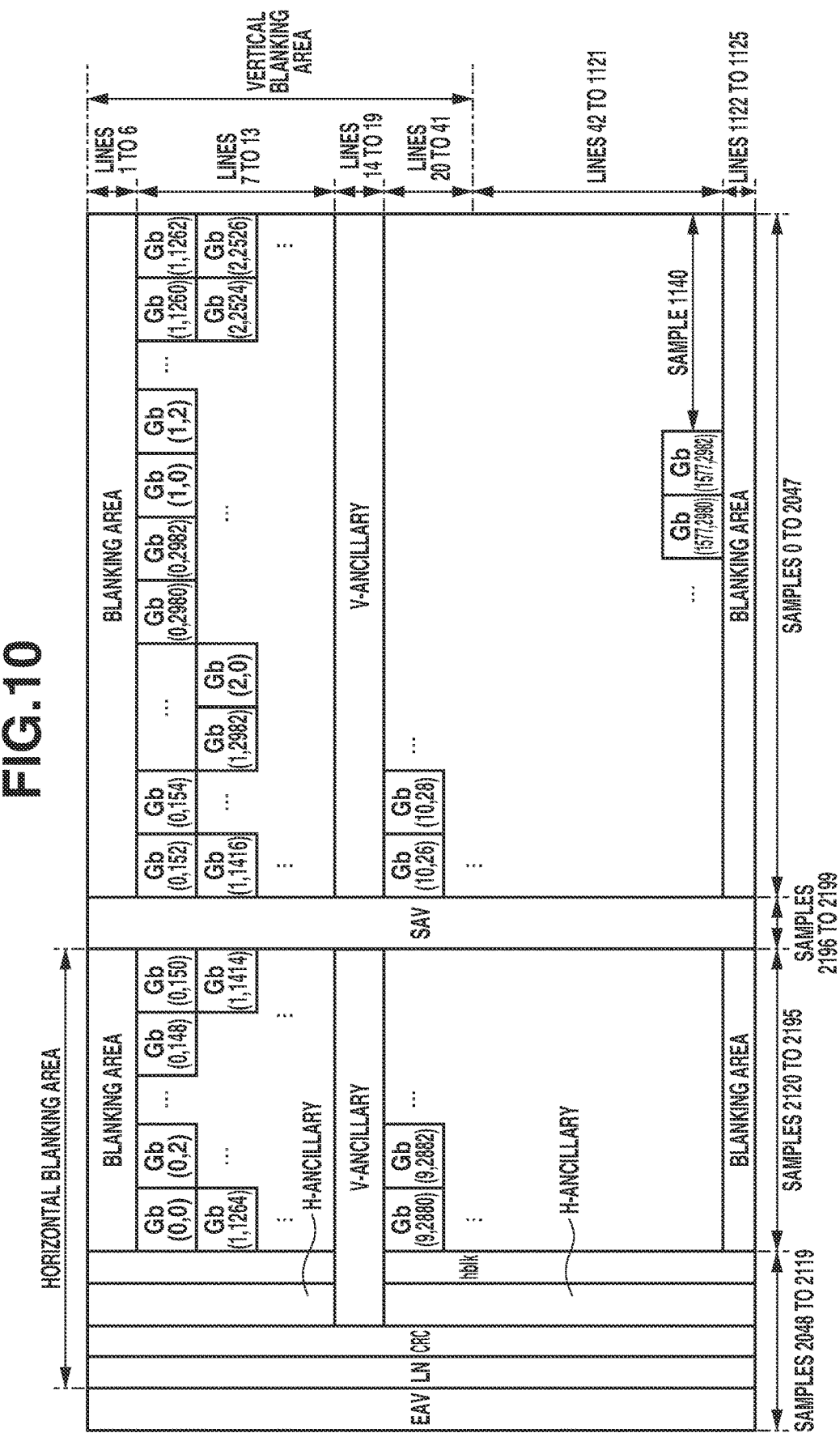
FIG. 10 is a diagram illustrating a data structure of a data stream generated based on an EVEN image.

FIG. 10 is a diagram illustrating a data structure of a data stream generated by mapping the pixel data of a color component Gb of the EVEN image onto the 3G-SDI transmission format. The EVEN image is multiplexed in an effective image period 2048×1080/30P and on horizontal and vertical blanking areas specified in SMPTE ST 2048-2. For example a pixel of the coordinates (0, 0) at the uppermost left end of the EVEN image is arranged on a sample 2120 of a line 7. Then, pixel data is sequentially arranged in a so-called raster scanning order. For example, if one pixel is arranged on a sample 2195 of the line 7, a next pixel is arranged on a sample 0 of the line 7 next to a start-of-active-video (SAV) area. Then, pixels are consecutively arranged up to a sample 2047 of the line 7. Similarly, pixels are arranged with respect to one line. When the pixel is arranged on the sample 2047 of the line 7, the next pixel is arranged on a sample 2120 of a line 8. When the pixel is arranged up to a sample 2047 of a line 13, the next pixel is arranged on a sample 2120 of a line 20. Then, a pixel of the coordinates (1577, 2982) at the lowermost right end of the EVEN image is arranged on a sample 907 of a line 1121.

FIG. 11 is a table illustrating an allocation structure of pixel data of the EVEN image to respective channels. A data stream of the Gb pixel data of the EVEN image generated as illustrated in FIG. 10 is allocated to a data stream 1 of a link-A. As with the Gb pixel data of the EVEN image, a data stream of the Gr pixel data of the EVEN image mapped on the 3G-SDI transmission format is allocated to a data stream 1 of a link-B. The pixel data of color components B and R of the EVEN image are mapped on the 3G-SDI transmission format through a method different from a method used for mapping the pixel data of color components Gb and Gr. With respect to the pixel data of color components Gb and Gr, one data stream is generated by mapping pixel data of one color component on one transmission format. However, with respect to the pixel data of color components B and R, mapping is executed such that the pixel data of two color components B and R exists in one transmission format in an intermixed state, and two data streams are generated from the EVEN image data of color components B and R. The two data streams generated from the pixel data of color components B and R mapped on the 3G-SDI transmission format are called as EVEN image BR data streams 1 and 2. In the EVEN image BR data stream 1, pixels B(0, 0), R(0, 0), B(0, 4), R(0, 4), . . . , B(0, 2980), R(0, 2980), B (1, 0), R(1, 0), . . . , B (1577, 2980), and R(1577, 2980) are respectively arranged at the positions where pixels Gb(0, 0), Gb(0, 2), Gb(0, 4), Gb(0, 6), . . . , Gb(0, 2980), Gb(0, 2982), Gb(1, 0), Gb(1, 2), . . . , Gb(1577, 2980), and Gb(1577, 2982) are arranged in the data stream in FIG. 10. In the EVEN image BR data stream 2, pixels B(0, 2), R(0, 2), B (0, 6), R(0, 6), . . . , B (0, 2982), R(0, 2982), B(1, 2), R(1, 2), . . . , B(1577, 2982), and R(1577, 2982) are sequentially arranged. In other words, the pixel data of color components B and R of the same coordinates are arranged in a same data stream. Then, the pixels B(0, 0) and R(0, 0) are firstly arranged in one of the data streams (i.e., EVEN image BR data stream 1), and the pixels B(0, 2) and R(0, 2) are firstly arranged in another data stream (EVEN image BR data stream 2). The pixel data of color components B and R of the same coordinates are arranged adjacent to each other in the order of the color components B and R in the pixel data arrangement area of the same data stream. Then, the pixel data of color components B and R are alternately arranged in the EVEN image BR data streams 1 and 2 in the order of the raster scanning direction in the EVEN image. The EVEN image BR data stream 1 generated as described above is allocated to a data stream 2 of the link-A, and the EVEN image BR data stream 2 is allocated to a data stream 2 of the link-B.

The multiplexer 104 generates respective data streams of the EVEN image according to this allocation structure. The multiplexer 104 further generates an identifier SAV/end-of-active-video (EAV) for recognizing a delimiting position of the image signal compliant with the SDI standard. Further, the multiplexer 104 generates line-number (LN) data for managing the line number and cyclic-redundancy-check-code (CRCC) data for checking a transmission error.

Figure 12:
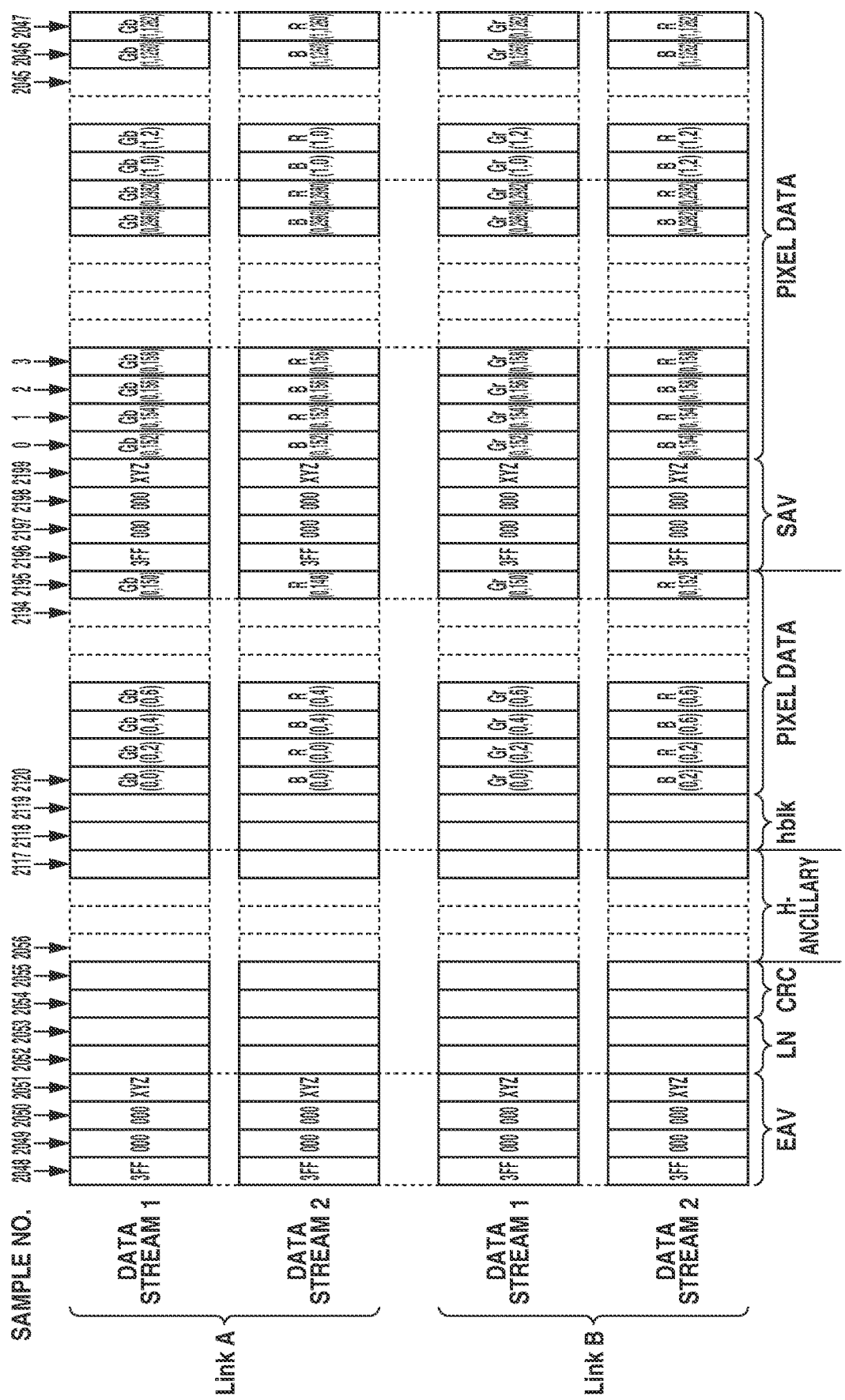
FIG. 12 is a diagram illustrating a data structure of pixel data of an EVEN image multiplexed on four data streams.

FIG. 12 is a diagram illustrating a result of multiplexing the pixel data of the EVEN image in FIGS. 10 and 11 onto four data streams. For example, the pixel Gb(0, 0) corresponds to the pixel data located at an upper left end of the pixel plane Gb. In FIG. 12, pixel data of color components R, Gr, Gb, and B arranged in two lines which constitute the RAW frame is multiplexed on four-line data streams. Four data streams generated from the EVEN image are output to the external apparatus through a single 3G-SDI transmission path from the 3G-SDI output terminal 1 of the external I/F 105 through multiplexing transmission.

Figure 13:
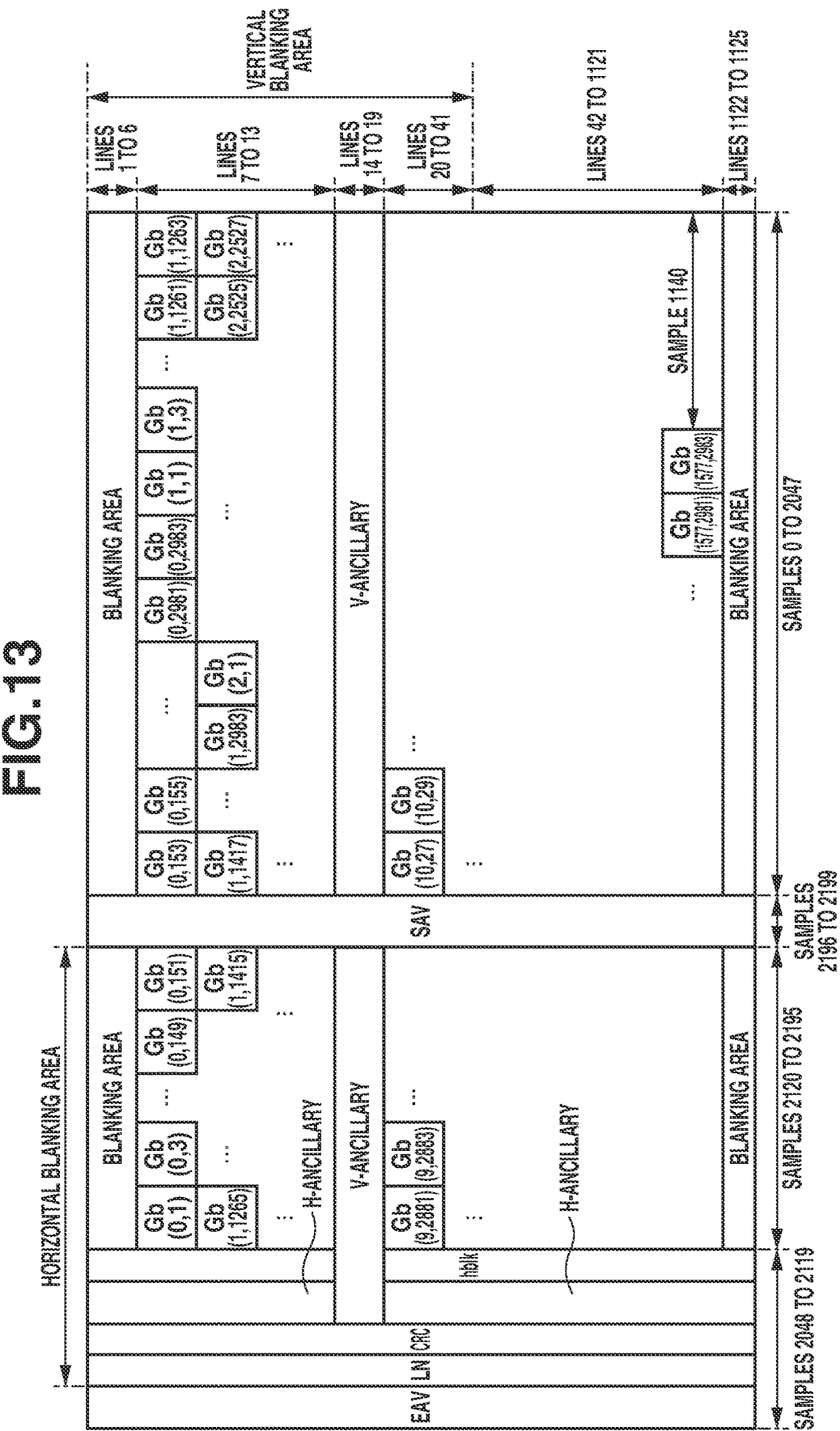
FIG. 13 is a diagram illustrating a data structure of a data stream generated based on an ODD image.

FIG. 13 is a diagram illustrating a data structure of a data stream generated by mapping the pixel data of a color component Gb of the ODD image onto the 3G-SDI transmission format. The ODD image is multiplexed in an effective image period 2048×1080/30P and on horizontal and vertical blanking areas specified in the standard of SMPTE ST 2048-2. For example a pixel of the coordinates (0, 1) at the uppermost left end of the ODD image is arranged on a sample 2120 of a line 7. Then, pixel data are sequentially arranged in a so-called raster scanning order. For example, if one pixel is arranged on a sample 2195 of the line 7, a next pixel is arranged on a sample 0 of the line 7 next to the SAV area. Then, pixels are consecutively arranged up to a sample 2047 of the line 7. Similarly, pixels are arranged with respect to one line. When a pixel is arranged on the sample 2047 of the line 7, the next pixel is arranged on a sample 2120 of a line 8. When a pixel is arranged up to a sample 2047 of a line 13, the next pixel is arranged on a sample 2120 of a line 20. Then, a pixel of the coordinates (1577, 2983) at the lowermost right end of the ODD image is arranged on a sample 907 of a line 1121.

FIG. 14 is a table illustrating an allocation structure of pixel data of the ODD image for respective channels.

A data stream of the pixel data of a color component Gb of the ODD image generated as illustrated in FIG. 14 is allocated to a data stream 1 of a link-A. As with the pixel data of a color component Gb of the ODD image, the pixel data of a color component Gr of the ODD image are mapped on the 3G-SDI transmission format. A data stream of the pixel data of a color component Gr of the ODD image is allocated to a data stream 1 of a link-B. As with the EVEN image, the pixel data of color components B and R of the ODD image are mapped on the 3G-SDI transmission format through a method different from a method used for mapping the pixel data of color components Gb and Gr. With respect to the pixel data of color components Gb and Gr, one data stream is generated by mapping pixel data of one color component on one transmission format. However, with respect to the pixel data of color components B and R, mapping is executed such that the pixel data of two color components B and R exists in one transmission format in an intermixed state, and two data streams are generated from the ODD image data of color components B and R. The two data streams generated from the pixel data of color components B and R mapped on the 3G-SDI transmission format are called as an ODD image BR data stream 1 and an ODD image BR data stream 2. In the ODD image BR data stream 1, pixels B(0, 1), R(0, 1), B(0, 5), R(0, 5), . . . , B(0, 2981), R(0, 2981), B (1, 1), R(1, 1), . . . , B (1577, 2981), and R(1577, 2981) are respectively arranged at the positions where pixels Gb(0, 1), Gb(0, 3), Gb(0, 5), Gb(0, 7), . . . , Gb(0, 2981), Gb(0, 2983), Gb(1, 1), Gb(1, 3), . . . , Gb(1577, 2981), and Gb(1577, 2983) are arranged in the data stream in FIG. 13. In the ODD image BR data stream 2, pixels B(0, 3), R(0, 3), B (0, 7), R(0, 7), . . . , B (0, 2983), R(0, 2983), B(1, 3), R(1, 3), . . . , B(1577, 2983), and R(1577, 2983) are sequentially arranged. In other words, the pixel data of color components B and R of the same coordinates are arranged in the same data stream. Then, the pixels B(0, 1) and R(0, 1) are firstly arranged in one of the data streams (i.e., ODD image BR data stream 1), and the pixels B(0, 3) and R(0, 3) are firstly arranged in another data stream (ODD image BR data stream 2). The pixel data of color components B and R of the same coordinates are arranged adjacent to each other in the order of the color components B and R in the pixel data arrangement area of the same data stream. Then, the pixel data of color components B and R are alternately arranged in the ODD image BR data streams 1 and 2 in the order of the raster scanning direction in the ODD image. The ODD image BR data stream 1 generated as described above is allocated to a data stream 2 of the link-A, and the ODD image BR data stream 2 is allocated to a data stream 2 of the link-B.

The multiplexer 104 generates respective data streams of the ODD image according to this allocation structure. The multiplexer 104 further generates an identifier SAV/EAV for recognizing a delimiting position of the image signal compliant with the SDI standard. Further, the multiplexer 104 generates LN data for managing the line number and CRCC data for checking a transmission error.

Figure 15:
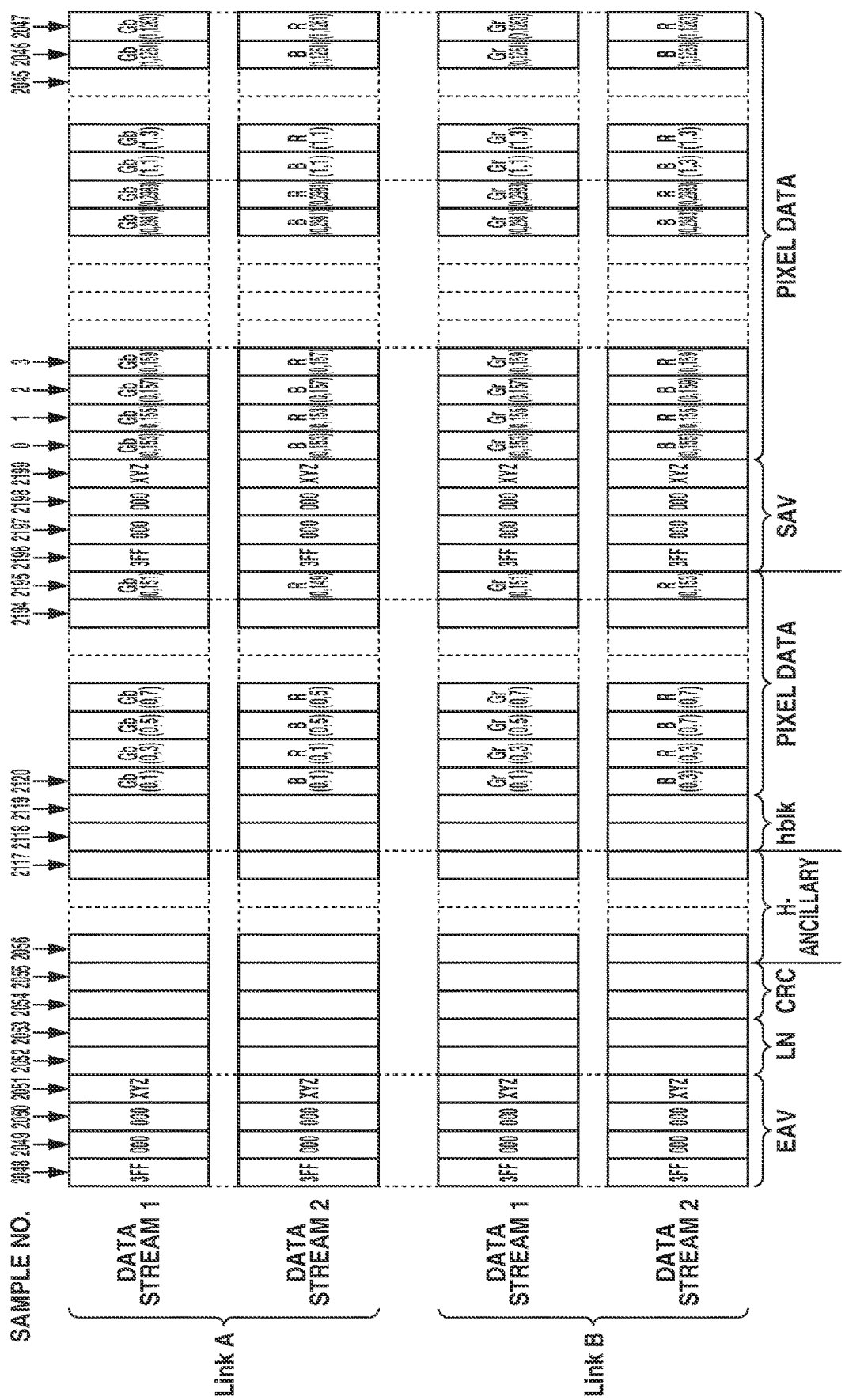
FIG. 15 is a diagram illustrating a data structure of pixel data of an ODD image multiplexed on four data streams.

FIG. 15 is a diagram illustrating a result of multiplexing the pixel data of the ODD image in FIGS. 13 and 14 onto four data streams. For example, the pixel data Gb(0, 1) corresponds to the pixel data located at an upper left end of the pixel plane Gb. In FIG. 15, pixel data of color components R, Gr, Gb, and B arranged in two lines, which constitute the RAW frame, is multiplexed on four-line data streams. Four data streams generated from this ODD image are output to the external apparatus through a single 3G-SDI transmission path from the 3G-SDI output terminal 2 of the external I/F 105 through multiplexing transmission. In addition, the four data streams of the EVEN image in FIG. 11 or 12 and the four data streams of the ODD image in FIG. 14 or 15 are data streams of the same image data. Therefore, the data streams of the EVEN image and the data streams of the ODD image are simultaneously and concurrently output from the 3G-SDI output terminals 1 and 2.

As described above, in the present exemplary embodiment, data streams are generated by dividing one image data into the EVEN image and the ODD image, and the respective data streams are output to the external apparatus through different 3G-SDI transmission paths. Therefore, pixel data of 5.9K RAW image data with a frame rate of 30 frame/second, having a size larger than an image data size transmittable in the 3G-SDI transmission format can be transmitted in a format compliant with the 3G-SDI standard.

As described above, dividing the image data into the EVEN image and the ODD image is beneficial in that the external apparatus as a transmission destination of the image data can easily execute the image processing. If the RAW frame is simply divided into an upper image and a lower image, development processing is executed through 2-tap processing with respect to an upper end line of the lower image, so that latency time of a period of approximately one frame occurs before the lower end line of the upper image is transmitted through the SDI. Therefore, a memory for storing the image data acquired in the latency time is to be used. According to the present exemplary embodiment, it is possible to avoid occurrence of the latency time and increase in memory usage.

Specifically, dividing the image data into the EVEN image and the ODD image in the horizontal direction (raster scanning direction) is beneficial in that the image processing can be easily executed. When development processing is executed through 2-tap processing from a Bayer image, two adjacent Bayer units as interpolation calculation sources can be acquired by executing latency time processing of a maximum of one-sample period. If the image data is divided into the EVEN image and the ODD image in the vertical direction, latency time processing of a maximum of one-line period is applicable in order to acquire two adjacent Bayer units as interpolation calculation sources, so that memory usage will be increased. According to the present exemplary embodiment, it is possible to avoid the above-described increase in memory usage.

Further, by employing simple development processing through SDI transmission in a Bayer unit which does not execute the 2-tap processing, respective pixels R, Gr, Gb, and B of the Bayer unit can be simultaneously acquired, and simple development processing can be executed without having the latency time. In the simple development processing, ½ resolution reduction processing can also be simultaneously executed. According to the present exemplary embodiment, the simple development processing and the ½ resolution reduction processing can be simply executed without increasing the latency time and the memory usage.

Further, because pixel data is multiplexed by using not only an effective image period 2048×1080/30P but also the horizontal and vertical blanking areas specified in the standard of SMPTE ST 2048-2, more pixels can be transmitted with fewer SDI cables.

Further, in the present exemplary embodiment, although transmission that is executed at a frame rate of 30P has been described, transmission at an increased frame rate can be possible by increasing the number of SDI cables.

Further, in the present exemplary embodiment, 5.9K RAW image data with a frame rate of 30 frame/second is divided into two divided images such as the EVEN image and the ODD image, and data streams of the EVEN image and the ODD image are separately output through two 3G-SDI transmission paths. However, if the image transmission apparatus includes four 3G-SDI transmission paths, the RAW image data may be divided into four divided images, and data streams of the respective divided images may be concurrently output through the four 3G-SDI transmission paths. With this configuration, pixel data of the RAW image data having a larger size can be transmitted in a format compliant with the 3G-SDI standard. In this case, for example, a plurality of divided areas is generated by dividing the RAW image data in the raster scanning direction in a single pixel unit at respective color components of the RAW image data, and the RAW image data is divided into four divided images by sequentially allocating the plurality of divided areas to the divided images 1 to 4 in the raster scanning direction. In other words, the pixel data having the coordinates of the horizontal direction of 0, 4, 8, and so on, are allocated to the divided image 1, the pixel data having the coordinates of the horizontal direction of 1, 5, 9, and so on, are allocated to the divided image 2, the pixel data having the coordinates of the horizontal direction of 2, 6, 10, and so on, are allocated to the divided image 3, and the pixel data having the coordinates of the horizontal direction of 3, 7, 11, and so on, are allocated to the divided image 4. Then, data streams are generated with respect to the divided images, and the data streams corresponding to the four divided images are respectively output through different 3G-SDI transmission paths.

Further, in the present exemplary embodiment, the image data is divided into two divided images by allocating the image data to the divided image 1 (EVEN image) and the divided image 2 (ODD image) in the raster scanning direction in a single pixel unit. However, the image data may be divided in the raster scanning direction in a unit of a plurality of pixels (e.g., 2-pixel unit), and the image data may be divided by sequentially (alternately) allocating the image data to a plurality of transmission paths in an order of the raster scanning direction in a unit of divided pixels. In consideration of the development processing to be executed by the external apparatus as a transmission destination, the image data is to be divided into a small pixel unit because the latency time and the memory usage will be increased if the image data is divided into a large pixel unit.

Further, in the above-described exemplary embodiment, although the RAW image data (moving image data) to be transmitted has a size greater than a size transmittable through the 3G-SDI, normal 3G-SDI transmission may be executed if the RAW image data has a size equal to or less than a size transmittable through 3G-SDI transmission. In the normal 3G-SDI transmission, image data is not divided into the EVEN image and the ODD image but mapped on the 3G-SDI transmission format, and a Gb data stream, a Gr data stream, a BR data stream 1, and a BR data stream 2 are generated. Then, these four data streams are multiplexed and output through a single 3G-SDI transmission path.

A configuration to be described in a second exemplary embodiment is basically similar to the configuration illustrated in the block diagram in FIG. 1 described in the first exemplary embodiment, and thus description thereof will be omitted. However, in the present exemplary embodiment, the external I/F 105 includes three output terminal compliant with the 3G-SDI standard (i.e., 3G-SDI output terminals 1, 2, and 3), and image data can be transmitted through two 3G-SDI transmission paths.

When image data having the Bayer structure is to be transmitted according to the SDI standard, the imaging apparatus of the present exemplary embodiment transmits the image data by dividing the image data into an EVEN image and an ODD image. Accordingly, the imaging apparatus also serves as a transmission apparatus of image data in addition to serving as an imaging apparatus. In the present exemplary embodiment, it is assumed that a transmission frame rate is 30 frames, numbers of transmitting pixels in a horizontal direction and a vertical direction are 5968 pixels and 3156 pixels respectively, and a bit depth is 12-bits. Then, image data is assumed to be transmitted through three SG-SDI transmission paths. However, the disclosure is not limited thereto. The present exemplary embodiment is different from the first exemplary embodiment in terms of the processing of the multiplexer 104.

The multiplexer 104 reads out one 5.9K RAW frame and maps the 5.9K RAW frame to the three 3G-SDI transmission paths. As with the first exemplary embodiment, the 5.9K RAW frame is divided and cut into an EVEN image and an ODD image as illustrated in FIGS. 6 and 8. As with the first exemplary embodiment, the upper 10-bits of each of the cutout EVEN image and the cutout ODD image are individually mapped on the 3G-SDI transmission path in a form illustrated in FIGS. 10 and 13, and a data stream is generated as illustrated in FIGS. 11, 12, 14, and 15. Then, as with the first exemplary embodiment, data streams of the EVEN image and the ODD image are respectively output from the 3G-SDI output terminals 1 and 2.

Subsequently, a transmission method of the lower 2-bits of data will be described. In the present exemplary embodiment, the lower 2-bits of data are output from the 3D-SDI output terminal 3 in concurrence with the higher 10-bits of data.

FIG. 16 is a diagram illustrating a structure in which the lower 2-bits of pixel data of four color components having the same coordinates are grouped into 10-bit data.

The lower 2-bits of Gb-pixels are allocated to the 0th-bit and the 1st-bit, the lower 2-bits of B-pixels are allocated to the 2nd-bit and the 3rd-bit, the lower 2-bits of Gr-pixels are allocated to the 4th-bit and the 5th-bit, and the lower 2-bits of R-pixels are allocated to the 6th-bit and the 7th-bit. The 8th-bit is an even parity bit indicating an error detection code, and the 9th-bit is a complement of the 8th-bit. The 10-bit data in which the lower 2-bits of pixel data of each of color components are grouped is called as "lower 2-bit pixel data", and the lower 2-bit pixel data corresponding to each set of coordinates is expressed as "L(vertical coordinate, horizontal coordinate)".

Figure 17:
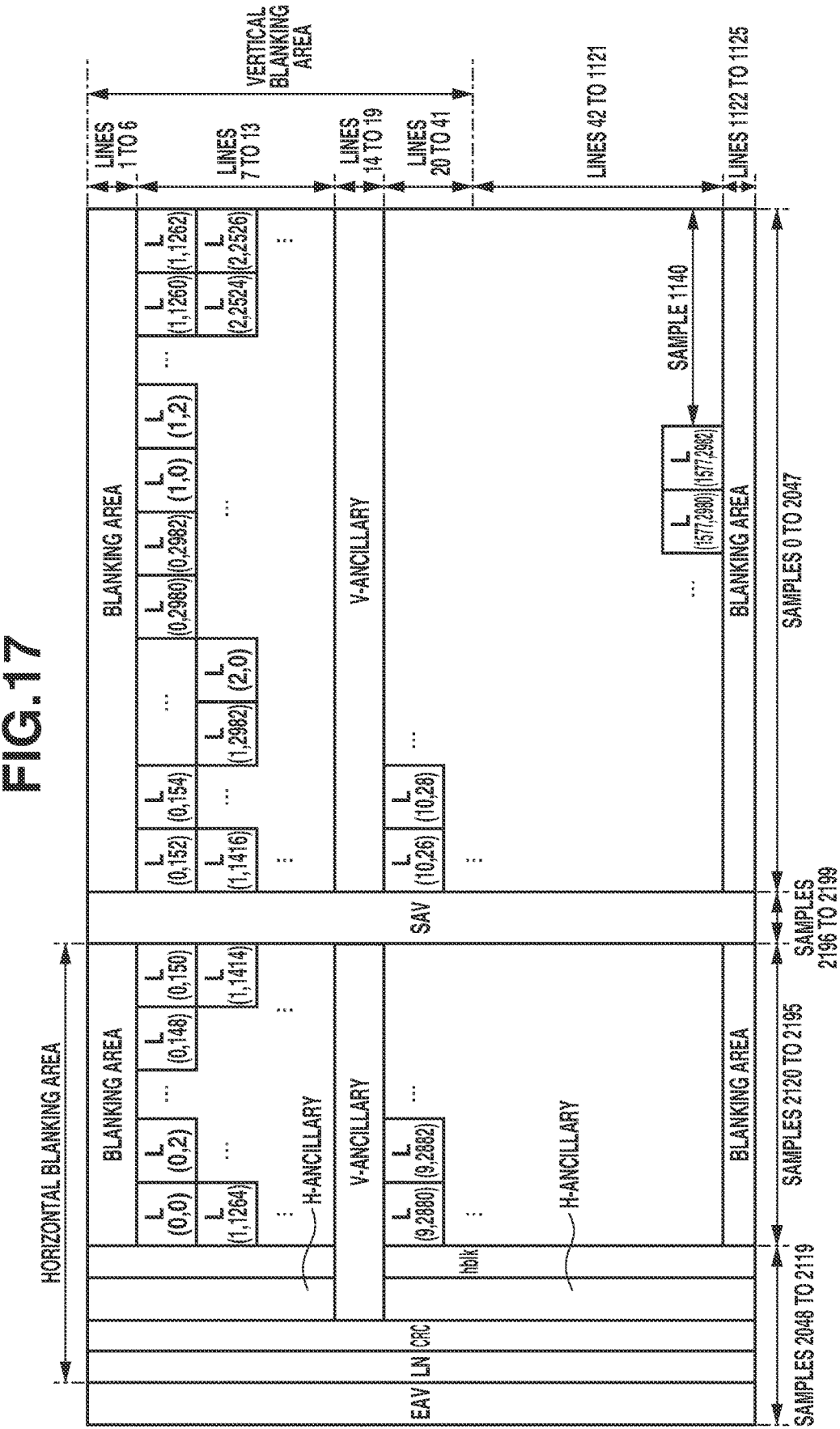
FIG. 17 is a diagram illustrating a data structure of a data stream generated by using the lower 2-bits of pixels of an EVEN image.

FIG. 17 is a diagram illustrating a data structure of a data stream corresponding to lower 2-bit pixel data of the EVEN image. The lower 2-bit pixel data of the EVEN image is multiplexed in an effective image period 2048×1080/30P and on horizontal and vertical blanking areas specified in SMPTE ST 2048-2. For example, the lower 2-bit pixel data of the coordinates (0, 0) at the uppermost left end of the EVEN image is arranged on a sample 2120 of a line 7. Then, the lower 2-bit pixel data is sequentially arranged in a so-called raster scanning order. For example, if the lower 2-bit pixel data is arranged on a sample 2195 of the line 7, a next pixel is arranged on a sample 0 of the line 7 next to the SAV area. Then, the lower 2-bit pixel data are consecutively arranged up to a sample 2047 of the line 7. When the lower 2-bit pixel data is arranged on the sample 2047 of the line 7, the next lower 2-bit pixel data is arranged on a sample 2120 of a line 8. When the lower 2-bit pixel data is arranged up to a sample 2047 of a line 13, the next lower 2-bit pixel data is arranged on a sample 2120 of a line 20. Then, the lower 2-bit pixel data of the coordinates L(1577, 2982) at the lowermost right end of the EVEN image is arranged on a sample 907 of a line 1121.

Figure 18:
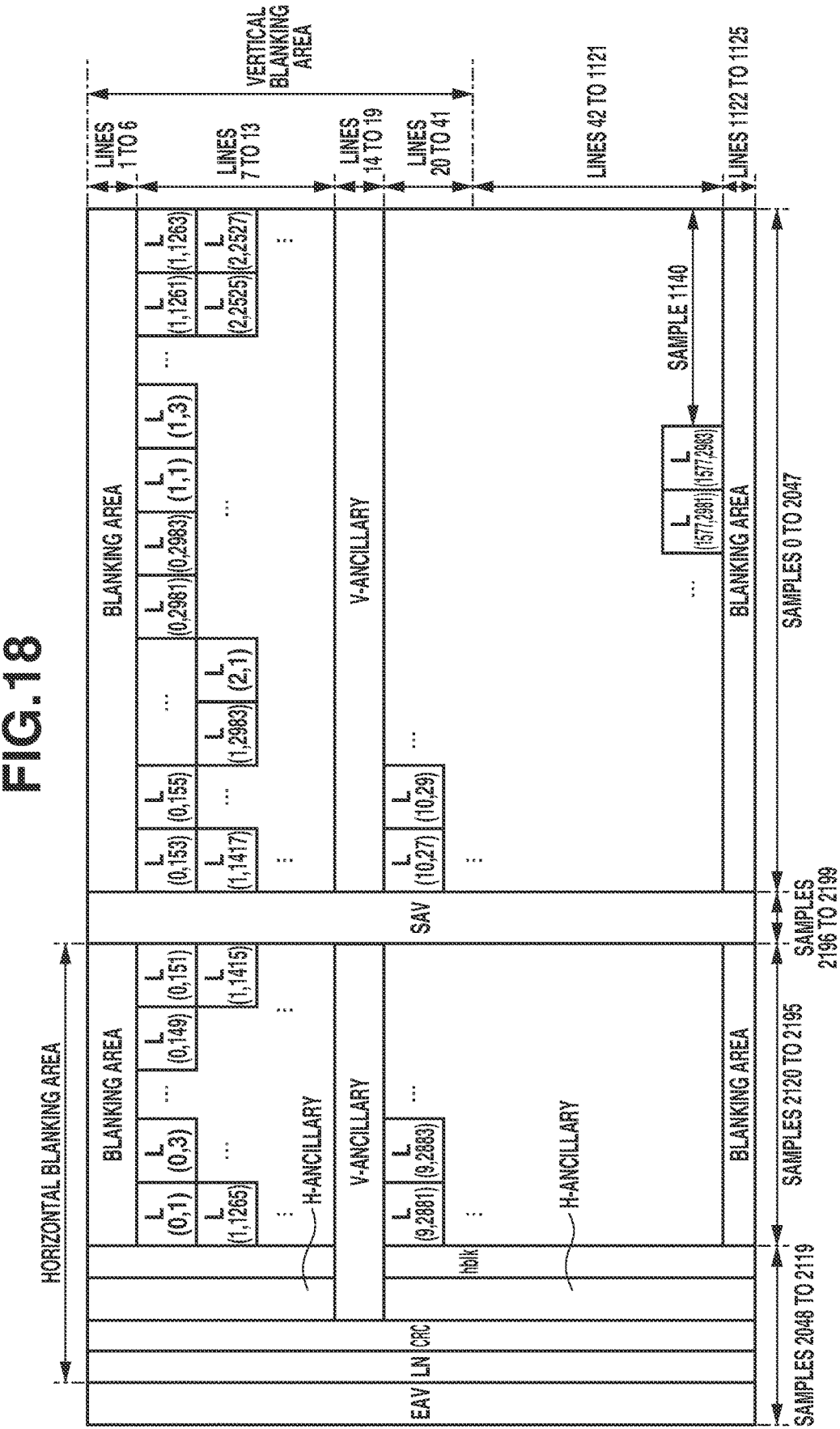
FIG. 18 is a diagram illustrating a data structure of a data stream generated based on the lower 2-bits of pixels of an EVEN image.

FIG. 18 is a diagram illustrating a data structure of a data stream corresponding to the lower 2-bit pixel data of the ODD image. The lower 2-bit pixel data of the ODD image is multiplexed in an effective image period 2048×1080/30P and on horizontal and vertical blanking areas specified in SMPTE ST 2048-2. For example, the lower 2-bit pixel data of the coordinates L(0, 1) corresponding to the pixel at the uppermost left end of the ODD image is arranged on a sample 2120 of a line 7. Then, the lower 2-bit pixel data is sequentially arranged in a so-called raster scanning order. For example, if the lower 2-bit pixel data is arranged on a sample 2195 of the line 7, the next lower 2-bit pixel data is arranged on a sample 0 of the line 7 next to the SAV area. Then, the lower 2-bit pixel data are consecutively arranged up to a sample 2047 of the line 7. When the lower 2-bit pixel data is arranged on the sample 2047 of the line 7, the next lower 2-bit pixel data is arranged on a sample 2120 of a line 8. When the lower 2-bit pixel data is arranged up to a sample 2047 of a line 13, the next lower 2-bit pixel data is arranged on a sample 2120 of a line 20. Then, the lower 2-bit pixel data of the coordinates L(1577, 2983) at the lowermost right end of the ODD image is arranged on a sample 907 of a line 1121.

Figure 19:
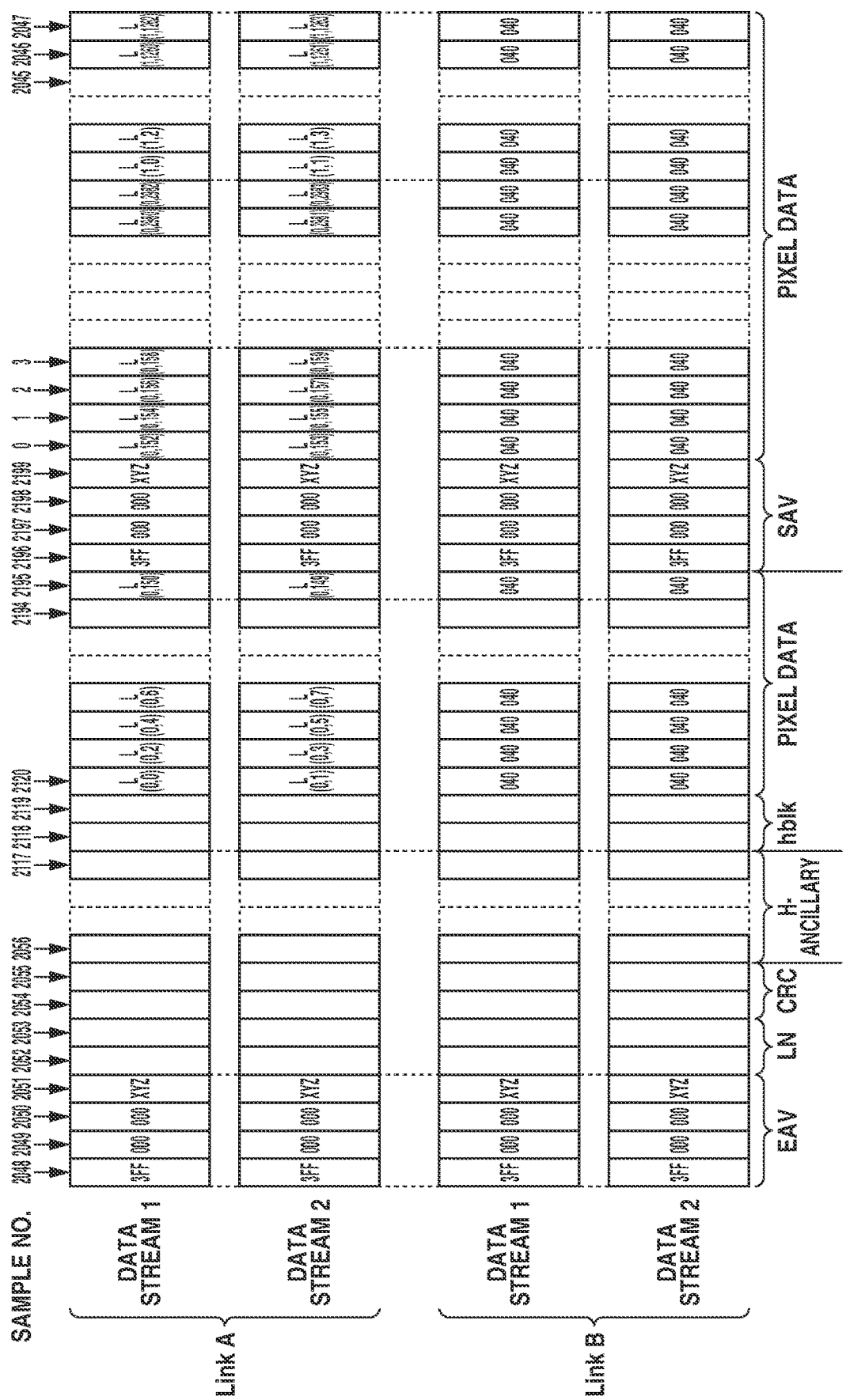
FIG. 19 is a diagram illustrating a data structure of the lower 2-bits of pixel data of an EVEN image and an ODD image multiplexed on four data streams.

FIG. 19 is a diagram illustrating a result of multiplexing the data stream of the lower 2-bit pixel data of the EVEN image in FIG. 17 and the data stream of the lower 2-bit pixel data of the ODD image in FIG. 18 onto four data streams. The data stream of the lower 2-bit pixel data of the EVEN image is allocated to a data stream 1 of the link-A, and the data stream of the lower 2-bit pixel data of the ODD image is allocated to a data stream 1 of the link-A. The lower 2-bit pixel data L(0, 0) at the upper left end of the EVEN image is arranged on a sample 2120 of the data stream 1 of the link-A. Similarly, the lower 2-bit pixel data L(0, 1) at the upper left end of the ODD image is arranged on a sample 2120 of the data stream 2 of the link-A. Because the data streams 1 and 2 of the link-B are not used, a fixed value "040" is set thereto.

The two data streams of the lower 2-bit pixel data of the EVEN image and the ODD image generated as described above are output from the 3G-SDI output terminal 3. The data streams of the lower 2-bit pixel data are output simultaneously with the output of the EVEN image and the ODD image, so that the data streams are concurrently output through the three 3G-SDI transmission paths.

As described above, with respect to the higher 10-bit pixel data, the EVEN image and the ODD image are respectively output through different 3G-SDI transmission paths. Then, with respect to the lower 2-bit pixel data, although data streams of the EVEN image and the ODD image are generated respectively, the data streams of the EVEN image and the data streams of the ODD image are output through a single 3G-SDI transmission path.

As described above, according to the present exemplary embodiment, even if the pixel data of the 5.9K RAW having a frame rate of 30 frame/second has a bit depth of 12-bits, image data can be transmitted in a format compliant with the 3G-SDI standard.

In the present exemplary embodiment, transmission of the RAW pixel data having a bit depth of 12-bits has been described. If the bit depth is 14-bits, the pixel data may be divided into higher 10-bits and lower 4-bits of data. In this case, with respect to each of the EVEN image and the ODD image, pixel data is divided into the lower 4-bit G-pixel data consisting of the lower 4-bits of pixels of color components Gb and Gr and lower 4-bit BR pixel data consisting of the lower 4-bits of pixels of color components B and R, and data streams are generated by respectively mapping the lower 4-bit G-pixel data and the lower 4-bit BR-pixel data onto the 3G-SDI transmission format. Then, the lower 4-bit G-pixel data of the EVEN image is allocated to a data stream 1 of the link-A, the lower 4-bit BR-pixel data of the EVEN image is allocated to a data stream 2 of the link-A, the lower 4-bit G-pixel data of the ODD image is allocated to a data stream 1 of the link-B, and the lower 4-bit BR-pixel data of the ODD image is allocated to a data stream 2 of the link-B. Then, these pieces of the lower 4-bit pixel data are output from the 3G-SDI output terminal 3.

In other words, even if the image data is RAW image data having a bit depth of N-bits greater than 10-bits, the RAW image data is divided into data of the higher 10-bits and the lower (N−10)-bits after being divided into the EVEN image and the ODD image. Then, data streams of the divided images are transmitted through a plurality of 3G-SDI transmission paths, so that the image can be transmitted in a format compliant with the 3G-SDI standard even if the image data is the RAW image data having the bit depth greater than 10-bits.

Other Exemplary Embodiments

While the disclosure has been described in detail with reference to the exemplary embodiments, it is to be understood that the disclosure is not limited to the above-described specific exemplary embodiments, and many variations which do not depart from the spirit of the disclosure should be included within the scope of the disclosure. Further, a part of the above-described exemplary embodiments can be combined with each other as appropriate.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-171862, filed Sep. 7, 2017, which is hereby incorporated by reference herein in its entirety.

What is claimed is:

1. An apparatus comprising:
a generation unit configured to generate a plurality of pieces of transmission data in a predetermined format respectively corresponding to a plurality of divided images by dividing image data into the plurality of divided images when the image data having a size larger than a size transmittable in the predetermined format is to be transmitted; and
an output unit configured to output the plurality of pieces of transmission data through a plurality of transmission paths,
wherein the generation unit divides the image data in a raster scanning direction in a unit of a predetermined number of pixels and sequentially allocates the image data of the unit of the predetermined number of pixels to a plurality of divided images in an order of the raster scanning direction to divide the image data into the plurality of divided images,
wherein the image data is a RAW image data in a Bayer array, and
wherein the generation unit divides the image data into the plurality of divided images such that pixel data in same coordinates in a Bayer unit is allocated to a same divided image.

2. The apparatus according to claim 1, wherein the generation unit divides the image data in a single pixel unit and sequentially allocates the image data divided into the single pixel unit to a plurality of divided images in an order of the raster scanning direction to divide the image data into the plurality of divided images.

3. The apparatus according to claim 1, wherein the generation unit divides the image data into odd pixels and even pixels in the raster scanning direction to generate transmission data consisting of the odd pixels and transmission data consisting of the even pixels, respectively.

4. The apparatus according to claim 3, wherein the output unit concurrently outputs the transmission data consisting of the odd pixels and the transmission data consisting of the even pixels through different transmission paths.

5. The apparatus according to claim 1, wherein the output unit concurrently outputs the plurality of pieces of transmission data through the plurality of transmission paths.

6. The apparatus according to claim 1, wherein the generation unit divides the image data at respective color components of the image data in the raster scanning direction in the unit of a predetermined number of pixels.

7. The apparatus according to claim 1, wherein the generation unit divides the image data in the raster scanning direction in the unit of a predetermined number of pixels with respect to respective color components of the image data and sequentially allocates the image data of the unit of a predetermined number of pixels to a plurality of divided images in an order of the raster scanning direction to divide the image data into the plurality of divided images.

8. The apparatus according to claim 1,
wherein the generation unit generates a plurality of pieces of transmission data corresponding to color components with respect to the divided images, and
wherein the output unit outputs the plurality of pieces of transmission data based on the same divided image in a single transmission path through multiplex transmission.

9. The apparatus according to claim 8,
wherein the generation unit generates first Green-component (G-component) transmission data and second G-component transmission data at each of color components with respect to a first G-component and a second G-component and generates two pieces of transmission data by alternately allocating Blue-component (B-component) pixel data and Red-component (R-component) pixel data of a divided image to first BR-transmission data and second BR-transmission data in the raster scanning direction with respect to a B-component and an R-component to generate transmission data of four color components from a single divided image, and wherein the output unit outputs the transmission data of the four color components through a single transmission path through multiplex transmission.

10. The apparatus according to claim 1, wherein the generation unit further divides N-bits of pixel data of the divided image into pixel data of upper 10-bits and lower (N−10)-bits with respect to the plurality of divided images, generates transmission data to be transmitted through different transmission paths at each of the divided images with respect to the pixel data of the upper 10-bits, and generates transmission data to make pixel data of different divided images be transmitted through a same transmission path with respect to the pixel data of the lower (N−10)-bits.

11. The apparatus according to claim 1, wherein, in a case where a size of the image data is equal to or smaller than a size transmittable in the predetermine format, the generation unit arranges the image data in the predetermined format without dividing the image data into the plurality of divided images to generate transmission data.

12. A control method of an apparatus which includes a plurality of transmission paths for transmitting image data in a predetermined format, the control method comprising:
   generating a plurality of pieces of transmission data in the predetermined format respectively corresponding to a plurality of divided images by dividing image data into the plurality of divided images when the image data having a size larger than a size transmittable in the predetermined format is to be transmitted; and
   outputting the plurality of pieces of transmission data through the plurality of transmission paths,
   wherein the generating divides the image data in a raster scanning direction in a unit of a predetermined number of pixels and sequentially allocates the image data of the unit of the predetermined number of pixels to a plurality of divided images in an order of the raster scanning direction to divide the image data into the plurality of divided images,
   wherein the image data is a RAW image data in a Bayer array, and
   wherein the generating divides the image data into the plurality of divided images such that pixel data in same coordinates in a Bayer unit is allocated to a same divided image.

13. The control method according to claim 12, wherein the generating divides the image data in a single pixel unit and sequentially allocates the image data divided into the single pixel unit to a plurality of divided images in an order of the raster scanning direction to divide the image data into the plurality of divided images.

14. The control method according to claim 12, wherein the generating divides the image data into odd pixels and even pixels in the raster scanning direction to generate transmission data consisting of the odd pixels and transmission data consisting of the even pixels, respectively.

15. A non-transitory computer readable storage medium storing a program of instructions for causing a computer to perform a method of an apparatus which includes a plurality of transmission paths for transmitting image data in a predetermined format, the method comprising:
   generating a plurality of pieces of transmission data in the predetermined format respectively corresponding to a plurality of divided images by dividing image data into the plurality of divided images when the image data having a size larger than a size transmittable in the predetermined format is to be transmitted; and
   outputting the plurality of pieces of transmission data through the plurality of transmission paths,
   wherein the generating divides the image data in a raster scanning direction in a unit of a predetermined number of pixels and sequentially allocates the image data of the unit of the predetermined number of pixels to a plurality of divided images in an order of the raster scanning direction to divide the image data into the plurality of divided images,
   wherein the image data is a RAW image data in a Bayer array, and
   wherein the generating divides the image data into the plurality of divided images such that pixel data in same coordinates in a Bayer unit is allocated to a same divided image.

16. The non-transitory computer readable storage medium according to claim 15, wherein the generating divides the image data in a single pixel unit and sequentially allocates the image data divided into the single pixel unit to a plurality of divided images in an order of the raster scanning direction to divide the image data into the plurality of divided images.

17. The non-transitory computer readable storage medium program according to claim 15, wherein the generating divides the image data into odd pixels and even pixels in the raster scanning direction to generate transmission data consisting of the odd pixels and transmission data consisting of the even pixels, respectively.

* * * * *